United States Patent [19]

Holz et al.

[11] 4,373,157

[45] Feb. 8, 1983

[54] SYSTEM FOR OPERATING A DISPLAY PANEL

[75] Inventors: George E. Holz, North Plainfield; Okan K. Tezucar, Scotch Plains, both of N.J.

[73] Assignee: Burroughs Corporation, Detroit, Mich.

[21] Appl. No.: 258,875

[22] Filed: Apr. 29, 1981

[51] Int. Cl.[3] .......... H01J 17/48; G02F 1/01

[52] U.S. Cl. .......... 340/805; 340/776; 315/169.4

[58] Field of Search .......... 340/766, 771, 776, 779, 340/805; 315/169.1, 169.4

[56] References Cited

U.S. PATENT DOCUMENTS

| | | | |
|---|---|---|---|
| 3,883,775 | 5/1975 | Aling | 315/169.1 |
| 4,104,563 | 8/1978 | Schlig | 340/805 |
| 4,203,104 | 5/1980 | Kmetz | 340/805 |
| 4,217,578 | 8/1980 | Inami | 340/772 |
| 4,302,756 | 11/1981 | Frankland | 340/776 |
| 4,328,489 | 5/1982 | Ngo | 340/805 |
| 4,329,616 | 5/1982 | Holz | 340/771 |

*Primary Examiner*—Michael A. Masinick
*Attorney, Agent, or Firm*—Kevin R. Peterson; Robert A. Green; David G. Rasmussen

[57] ABSTRACT

The disclosure is of a system for operating a dot matrix display panel including elongated anodes and cathodes oriented transversely to each other to define columns of D.C. scanning cells. An array of quasi A.C. display cells is provided spaced from the D.C. scan cells by an apertured electrode plate. Operation of the D.C. scan cells to transfer glow from a scan cell to an associated display cell is achieved by momentarily turning off the scan cell by the application of a negative pulse to its anode. To prevent the coupling of this pulse to adjacent anodes and spurious operation of adjacent scan cells and display cells, a counter-balancing positive pulse is applied to all anodes. The preferred coupling circuitry includes coupling capacitors which can pass both of these positive and negative pulses.

8 Claims, 6 Drawing Figures

SYSTEM FOR OPERATING A DISPLAY PANEL

BACKGROUND OF THE INVENTION

A new type of display panel comprises a gas-filled envelope including a layer of D.C. scan/address cells and a layer of quasi A.C. display cells. The scan cells are scanned and turned on column-by-column by operation of their electrodes, and the same electrodes are used to transfer information from selected scan cells to the associated display cells where glow can be sustained so that the cells which are energized in the entire panel display a stationary but changeable message.

The electrical system for operating the panel and the panel itself are relatively complex; and, under some circumstances, cross-talk may occur, that is, unselected display cells may turn on when a selected display cell is turned on and glows.

The present invention provides an electronic system which prevents cross-talk in operating a display panel of the type described.

DESCRIPTION OF THE INVENTION

Figure 1:
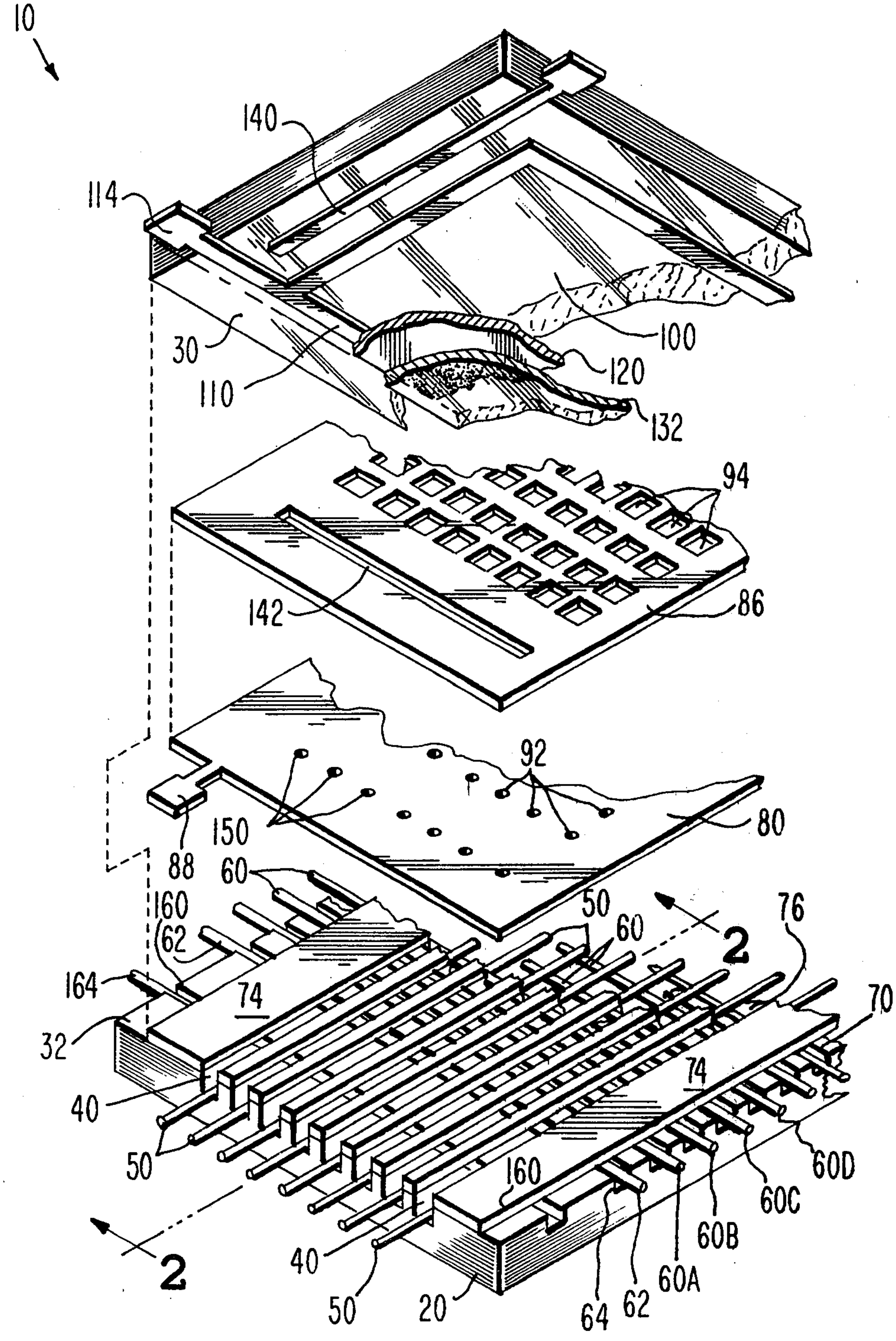
FIG. 1 is a perspective exploded view of a display panel operated according to the invention.

The display panel 10 described herein and in application Ser. No. 051,313 by Holz and Ogle comprises a gas-filled envelope made up of an insulating base plate 20 and a glass face plate 30, which is shown tilted up and to the left in FIG. 1 to present a view of its inner surface. These plates are hermetically sealed together along their aligned perimeters to provide an envelope which encloses the various gas-filled cells and operating electrodes of the panel. The base plate has a top surface 22 in which a plurality of deep parallel slots 40 are formed and in each of which a scan/address wire anode electrode 50 is seated and secured.

Figure 2:
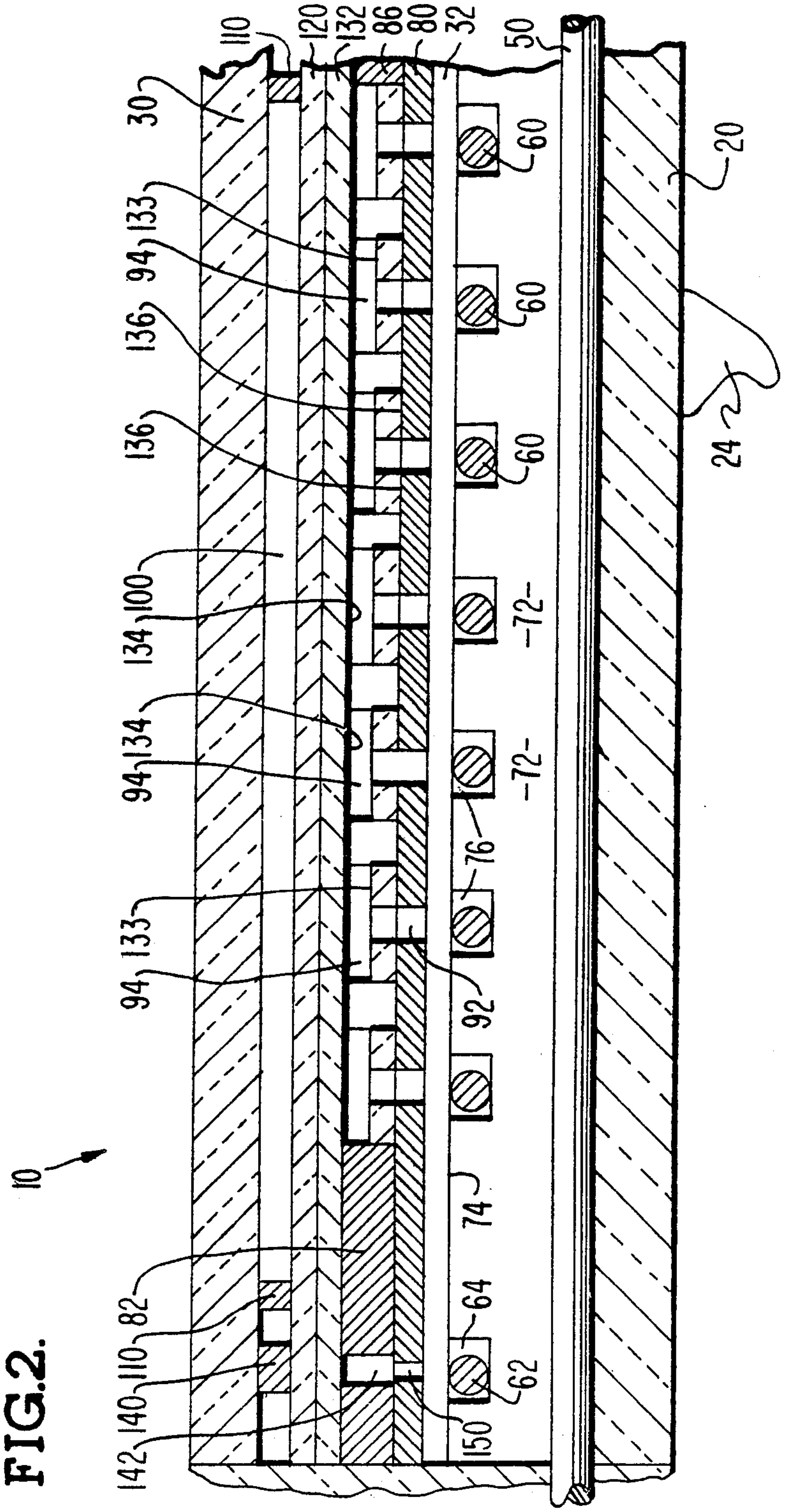
FIG. 2 is a sectional view through the panel of FIG. 1 along lines 2—2, with the panel shown assembled.

A plurality of wire scan cathode electrodes 60 are seated in shallow parallel slots 70 in the top surface of the base plate. The slots 70 and scan cathodes 60 are disposed transverse to the slots 40 and scan anodes 50, and each crossing of a scan cathode 60 and scan anode 50 defines a scanning cell 72 (FIG. 2). It can be seen that the anodes 50 and cathodes 60 form a matrix of scanning cells which are arrayed in rows and columns. More specifically, the cathode portions 61, the underlying portions of anodes 50, and the intermediate gas volumes define the scanning cells.

The scan cathodes 60A, B, C, etc., form a series of cathodes which can be energized serially in a scanning cycle, with cathode 60A being the first cathode energized in the scanning cycle.

A reset cathode wire 62 is disposed in a slot 64 in the top surface of the base plate adjacent to the first scan cathode 60A, so that, when it is energized, it provides excited particles for cathode 60A at the beginning of a scanning cycle to be described. Where the reset cathode crosses each scan anode 50, a reset cell is formed, and the crossing of all of the scan anodes by the reset cathode provides a column of reset cells. These reset cells are turned on or energized at the beginning of each scanning cycle, and they expedite the turn-on of the first column of scanning cells associated with cathode 60A.

The panel 10 includes a keep-alive arrangement which is described below and in copending application Ser. No. 108,805, filed Dec. 31, 1979, and incorporated herein by reference.

In the panel 10, it is desirable that the cathodes 60, or at least the portions 61 thereof which are disposed in the scanning cells, be spaced uniformly from an electrode 80 disposed above the cathodes and described below. It is also desirable to provide means for preventing the spread of cathode glow from the operating portions 61 of the cathodes to the intermediate portions. These conditions are satisfied by providing a thin slotted insulating sheet 74 on the top surface of the base plate 20.

The portions of the panel described up to this point comprise the base plate assembly. This is the D.C. portion and the scanning and addressing portion of the panel 10 in which the electrodes are in contact with the gas in the panel.

Adjacent to the base plate assembly is the second portion of the panel which is a quasi A.C. assembly; that is, it includes electrodes which are insulated from the gas in the panel, and electrodes which are in contact with the gas. This portion of the panel includes an electrode in the form of a thin metal plate 80 having an array of rows and columns of relatively small apertures 92, each overlying one of the scanning cells. The plate 80 is positioned close to cathodes 60 and may be seated on insulating sheet or layer 74, if this is provided, or directly on the top surface of the base plate 20. Plate 80 is known as a priming plate.

Adjacent to plate 80, and preferably in contact with the upper surface thereof, is an apertured plate or sheet 86 having rows and columns of apertures 94 which are larger than apertures 92. The apertures 94 comprise the display cells of panel 10. The sheet 86 may be of insulating material, or it may be of metal, and, if it is of metal, the plates 80 and 86 may be made in one piece, if desired and if feasible. Plates 80 and 86 are provided with tabs 88 to which external contact can be made.

The quasi A.C. assembly also includes a face plate assembly which includes a single large-area transparent conductive electrode 100 on the inner surface of the plate 30. A narrow conductor 110, which outlines and reinforces the electrode layer 100 in conductive contact, serves to increase its conductivity, if necessary. The conductor 110 includes a suitable tab portion 114, to which external connection can be made. The large-area electrode 100 is of sufficient area to overlie the entire array of display cells 94 in plate 86. An insulating coating 120 of glass or the like covers electrode 100.

Under some circumstances, it is desirable to coat the glass layer 120 with a low work function refractory layer 132 of magnesium oxide, thorium oxide, or the like.

In panel 10, the apertures 94 in plate 86 comprise display cells, and, as can be seen in FIG. 2, each display cell has one end wall 134 formed by a portion of insulating layer 132, and an opposite end wall 136 formed by a portion of the top surface of plate 80. To provide cell uniformity and to minimize sputtering, a coating of the material of layer 132 should also be provided on the base or lower wall 136 of each display cell 94, such as the layer 133 shown in FIG. 2.

At the present time, it appears that optimum operation of the panel is achieved if the apertures or cells 94 are unsymmetrical in that insulating layers 120 and 132 together have a thickness greater than layer 133. Indeed, layer 133 may even be thinner than layer 132. Thus, the lower end wall 136 of each cell 94 will have a very high capacitance coupling to the cell, and layer 133 will consequently tend to form only a minimal wall charge in the operation described below. In one mode of construction, both layer 132 and layer 133 may be formed by an evaporation process, and layer 133 may be so thin that it is not completely continuous, which is a desirable quality. In any case, however, the character of this wall of the cell is affected by the aperture 92 in the metal plate 80.

The gas filling in panel 10 is preferably a Penning gas mixture of, for example, neon and a small percentage of xenon, at a pressure of about 400 Torr. When the panel has been constructed and evacuated, the gas filling is introduced through a tubulation 24 secured to base plate 20 (FIG. 2), or a non-tubulated construction can be employed.

The keep-alive arrangement, in panel 10 includes an A.C. electrode 140 in the form of a line-like conductive film or layer of opaque metal, such as silver, provided on the inner surface of the face plate 30 adjacent to one edge of the transparent conductive electrode 100. The A.C. keep-alive electrode 140 is positioned so that, in the completed panel, it overlies the column of reset cells and reset cathode 62, to which it supplies excited particles. The A.C. keep-alive electrode 140 is covered by the insulating layers 120 and 132. In this keep-alive arrangement, the plate 86 is provided with a slot 142, and plate 80 is provided with a column of holes 150. The slot 142 overlies and is aligned with the column of holes 150, and both lie beneath and are aligned with the A.C. electrode 140 so that, in effect, the electrode 140, slot 142 and holes 150 form a sandwich. The slot 142 in the plate 86 is narrower than the opaque A.C. electrode 140 so that a viewer, looking through face plate 30, cannot see any glow which is present in slot 142 and holes 150. Electrode 140 operates with plate 80 to produce glow discharge between them and produce excited particles in slot 142 and holes 150. These excited particles are available to the reset cathode 62 and assist the firing of the column of reset cells.

Systems for operating panel 10 are described in application Ser. No. 051,313 and in a copending application of Joseph E. McKee and James Y. Lee, Ser. No. 200,160, filed Oct. 24, 1980 for SYSTEM FOR OPERATING A DISPLAY PANEL HAVING MEMORY, which is also incorporated herein by reference. Some of the principles of these systems are useful in the system described below.

Figure 3:
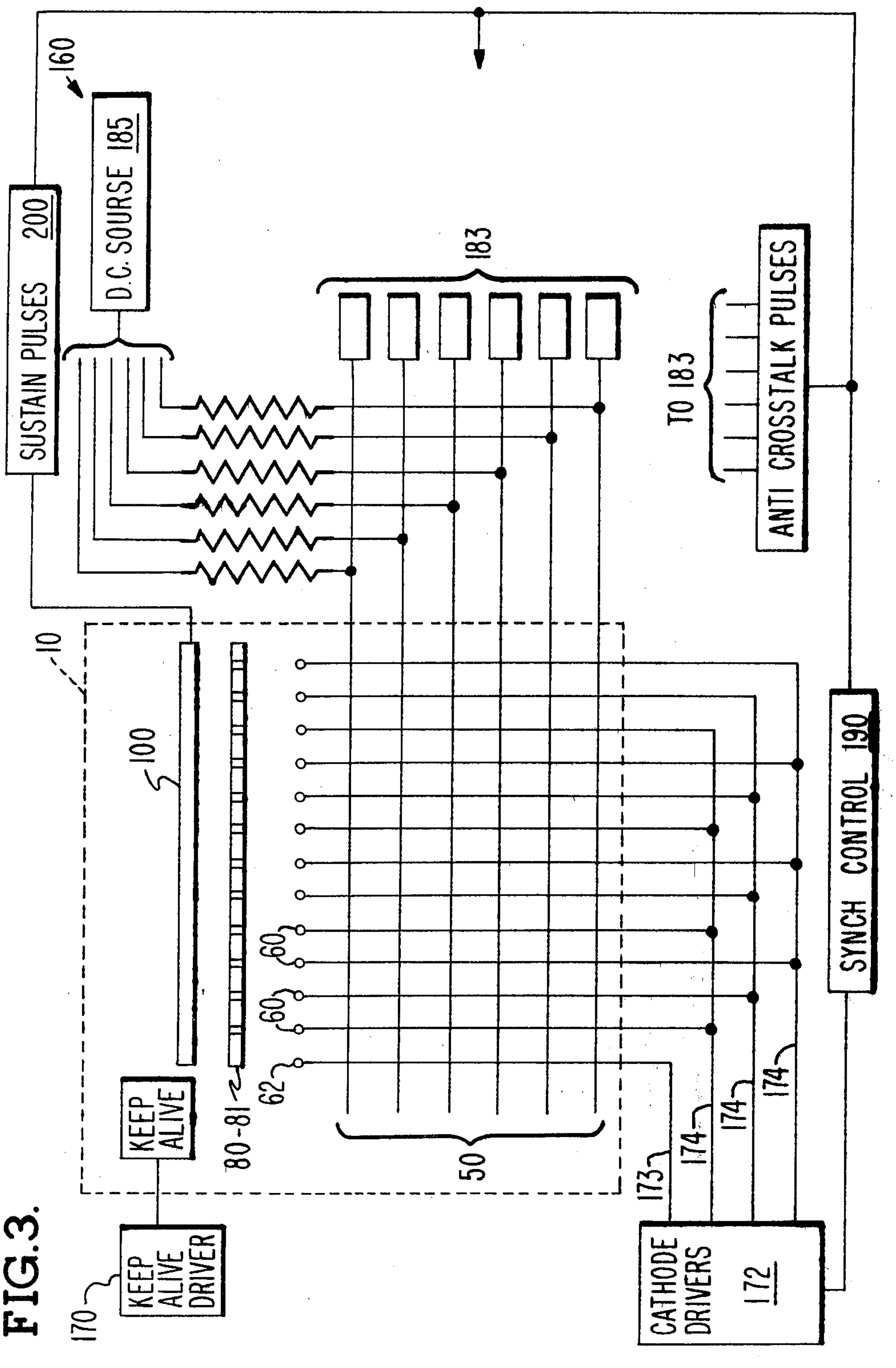
FIG. 3 is a schematic representation of the panel of FIG. 1 and an electronic system in which it may be operated.

A schematic representation of the display panel 10 and an electronic system 160, according to the invention, for operating the panel are shown in FIG. 3. The circuit includes a keep-alive driver 170, which provides an A.C. signal, suitably coupled to keep-alive electrode 140. The system also includes module 172 which comprises a series of serially energizable drivers for providing a negative reset pulse for reset cathode 62 on lead 173 and a series of negative scan cathode pulses for cathodes 60 on leads 174. The scan cathodes 60 are connected in groups or phases, with each group including any suitable number of cathodes such as three or four or six, or more, as desired. Grouping of cathodes in this way is now well known in the SELF-SCAN panel art. The scan phase drivers in module 172 are sequentially activated so as to energize each of the cathodes 60 in consecutive sequence along the "X" axis of the panel.

A D.C. power source 185 is coupled through a resistive path to each of the scan anodes 50. In addition, separate data drivers 183, each of which represents a source of write pulses and erase pulses, are coupled, one to each scan/address anode 50. According to the invention, cross-talk preventing means, to be described below, is also provided.

A source 187 of D.C. bias potential is coupled to priming plate 80, and a source 200 of A.C. sustainer signals, is connected to the transparent conductive layer 100.

Suitable timing and synchronizing circuits 190 are provided as required.

The operation of display panel 10, as described in the above-identified applications, is generally as follows. With the keep-alive mechanism energized by source 170 and generating excited particles, and with operating potential applied to the scan anodes 50 from source 185, the reset cathode 62 is energized to fire the column of reset cells, and then the scan cathodes 60 are energized sequentially by operation of driver module 172 to carry out a scanning operation in the D.C. scan portion and scan cells 76 of the panel 10. At the same time, with A.C. sustaining pulses applied from source 200 to the electrode 100, as each column of scan cells is energized, negative write or display pulses are applied from one or more selected driver modules 183, in accordance with input data and with proper timing with respect to the sustaining pulses, to the selected scan anodes to interrupt current flow in the scan cells defined by these selected scan anodes. This interplay of signals and interruption of scan current causes the formation of positive column discharge through apertures 92 into the associated display cells 94 to cause glow to develop in these associated display cells 94 where it is sustained by the sustaining pulses. When all of the columns of scan cells 76 have been energized and the appropriate associated display cells have been energized, a sustained message is present and visible in the upper display portion of the panel, and the scanning section of the panel may be made inactive.

Under some circumstances in the foregoing operating cycle, when negative write or erase signals are applied to selected anodes, these applied signals are coupled to adjacent non-selected anodes, and spurious glow occurs in non-selected display cells.

According to the invention, means are provided to insure proper turn-on of selected display cells as each column of scan cells is energized without cross-talk causing spurious turn-on of adjacent non-selected display cells in a column. In the broadest terms, this means comprises a source 210 of generally positive pulses 212 (FIG. 4) coupled by separate leads to all of the anode drivers 183. Specifically, as each column of scan/address cells is turned on and one or more anodes 50 is energized by a negative write pulse 214 (FIG. 4) from its data driver 183 to cause the associated display cells to turn on and glow, a pulse 212 from source 210 is also applied to all of the scan/display anodes, including the selected anode. However, the negative write pulse 214 overcomes the effect of the positive anti-cross-talk pulse 212 to achieve the desired turn-on of the selected display cell or cells.

This preventive operation applied to the non-selected scan anodes prevents these anodes from being reduced to such a negative potential that glow is transferred to the associated display cells.

Figure 4:
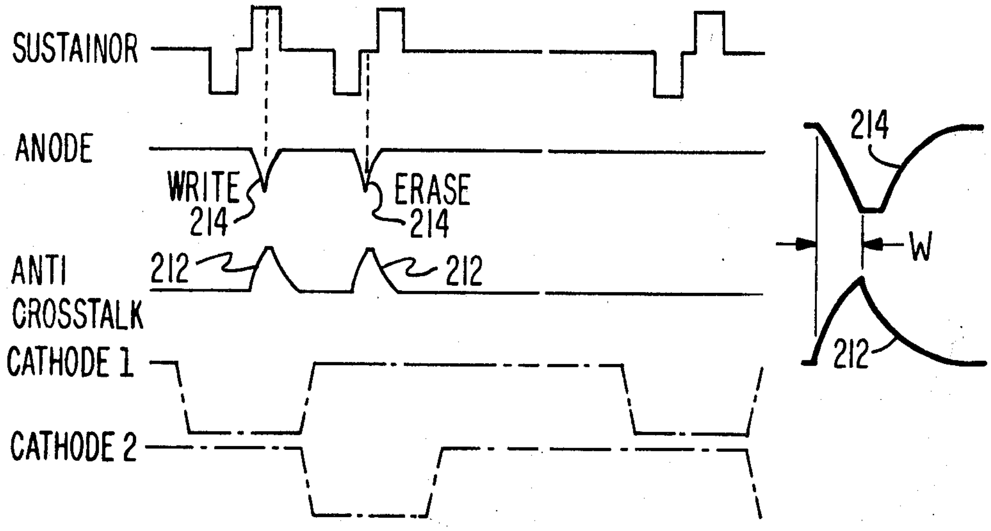
FIG. 4 is a representation of some of the waveforms used in operation of the system of the invention.

The pulses 212 applied by the cross-talk prevention circuit 210 are generally positive pulses which have an amplitude of about 60 volts, and they start, perhaps 100 nanoseconds, before the start of a write pulse 214, which may be about 150 volts negative. The pulses 212 also decay to zero slowly after the termination of a write pulse. The time duration may be about two or three microseconds. As shown in FIG. 4, the pulse widths "W" for the write pulse and anti-cross-talk pulse should be generally equal.

Some typical operating waveforms and their time relationships for use in panel 10 are shown in FIG. 4. The waveforms include the sustainer signals 217 which are applied to electrode 100 and the positive scan pulses 219 which are applied to the scan/address anodes during transfer of glow from column to column in a scanning operation. In addition, the write pulse 212 which is applied to a selected anode to cause glow in a display cell is shown. The anti-cross-talk pulse 214 which accompanies a write pulse is shown. Two voltage waveforms which are applied to two adjacent cathodes to turn on two adjacent columns of scan/address cells are shown. The number of such cathode pulses applied is determined by the number of groups of cathodes in the panel 10.

As shown, if an erase pulse is applied to an anode, anti-cross-talk pulses 214 are also applied.

Figure 5:
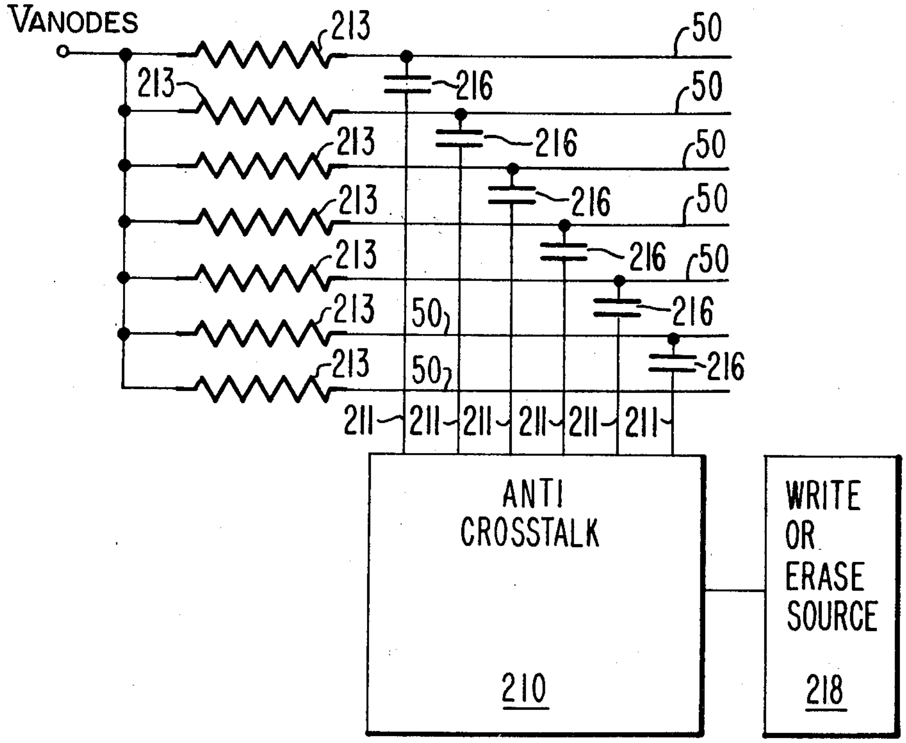
FIG. 5 is a schematic circuit representation of a portion of the system of FIG. 3 shown in greater detail.

In a preferred arrangement shown in FIG. 5, the cross-talk prevention circuit 210 has output leads 211, each of which is coupled through a capacitor 216 to a scan/address anode 50. As noted above, anode power or bias is connected through a separate resistor 213 to each anode. With this arrangement, using capacitors 216, optimum, bidirectional coupling of positive anti-cross-talk pulses 212 and negative write pulses 214 to the scan/address anode 50 is achieved. In addition, the anode circuit elements, resistors 213 and capacitors 216, can be fabricated by screening or semiconductor processing techniques, by which they can be incorporated directly within the panel 10.

Figure 6:
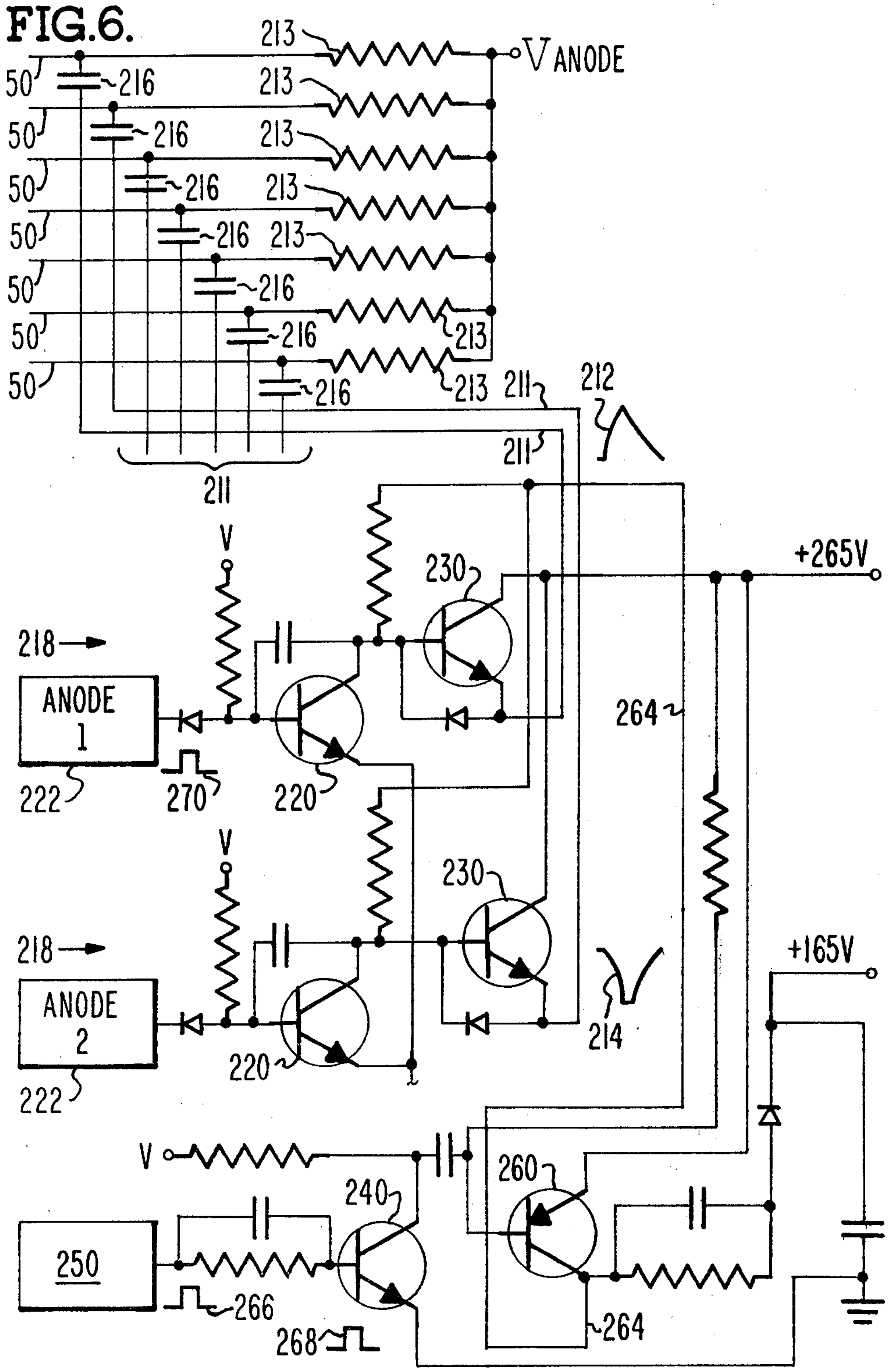
FIG. 6 is a more detailed schematic representation of a portion of the system of the invention.

As illustrated in FIG. 5 and FIG. 6, the write signals from a source 218 and anti-cross-talk signals may be coupled through common circuitry to leads 211 and capacitors 216 to the anodes.

In a more detailed system for carrying out the invention, shown in FIG. 6, a write or display circuit 218 coupled to each scan/address anode includes a first NPN transistor 220 having its base connected to a signal source 222 and its output connected to a second NPN transistor 230 having its emitter connected to lead 211 and to capacitor 216 coupled to a scan/address anode 50.

Circuit 210 for generating the anti-cross-talk pulses includes an NPN transistor 240 having a write or erase signal source 250 connected to the base thereof and having its output coupled to a PNP transistor 260 having its output connected by lead 264 to the inputs of all of the output transistors 230 of the anode circuits 218.

In operation of the circuit of FIG. 6, signal source 250 provides a generally positive pulse 266 which is coupled through transistors 240 and 260 to provide a similar pulse 268 on output lead 264. The pulse 268 is coupled to the inputs of all of the transistors 230, the associated circuit elements of which produce anti-cross-talk pulses 212 on leads 211. At the same time, a selected anode write circuit 218 receives a positive pulse 270 from its source 222, and this is processed by transistors 220 and 230 to provide the generally negative write pulse 214 on the selected lead 211. These signals, pulse 214 to one or more selected anodes and pulses 212 to all of the anodes, combine to cause the selected anode or anodes to operate and to produce glow in the associated display cell or cells while preventing all of the other non-selected anodes from causing display glow to develop.

It is noted that the anti-cross-talk pulses are also applied when selected cells are erased as illustrated on the anode line in the waveforms of FIG. 4.

To summarize some of the features of panel 10 and the system of the invention, it is noted that the panel 10 utilizes an A.C. memory layer for both write and erase operations which are accomplished using the scan discharge for column selection. The specific addressing mechanism or column selection is achieved by selective interruption of the scan current at the appropriate time in the sustaining cycle to cause the formation of supported positive columns through the small holes 92 in the priming plate 80. These positive columns deposit electrons on the A.C. cell wall 134, making the wall voltage more negative and causing a write or erase of the A.C. cell, depending upon the prior wall voltage state.

Since only negative changes in wall voltage can be accomplished using the positive column, only a single A.C. electrode can be effectively set at a time. Therefore, an asymmetrical A.C. cell design, in which essentially all wall voltage is developed on one electrode, provides the largest addressing margins.

The front portion of the A.C. memory cell is made up of the transparent electrode 100, glass layer 120, and low work function refractory overcoat 132. The rear electrode, however, is formed by the coated metal priming plate 80 and combines the low uniform work function and low sputtering rate of the refractory coating 132 with other properties more characteristic of D.C. electrodes. The operation of this electrode 80 may be understood by considering that the current flow in the cell is A.C. and is charge-limited by the small front electrode capacitance. Thus, the relatively high capacitance of the thin film overcoat layer 133 on the metal priming plate 80 does not result in a significant voltage buildup.

It is interesting to note that the overcoat layer 133 is not required to completely coat the priming plate 80 and that its low work function compared to the oxidized metal surface causes the glow to form selectively on the low work function coated portions. This work function difference is also valuable in keeping the memory discharge on the front of the priming plate, avoiding undesired memory to scan interactions.

Since the display current in panel 10 is not handled by the data drivers as in prior art SELF-SCAN panels, and average duty cycle is reduced by the elimination of continuous refresh requirements of such panels, simple passive data drive circuitry can be used for each scan anode without a significant reduction in overall power efficiency.

What is claimed is:

1. A display panel and operating system therefor comprising a gas-filled display panel including a matrix of D.C. scanning cells arrayed in columns and having scan electrode means for turning on all of the cells of each column sequentially and for selectively turning off one or more scan cells in each column as the column is turned on; and a matrix of display cells adjacent to said matrix of scanning cells, with each scanning cell communicating with a display cell through a small aperture in an electrode plate, and having display electrode means for operation to sustain display glow after glow has been transferred thereto from a scanning cell, a source of sustaining signals coupled to said display electrode means, a source of display signals coupled to said scanning electrode means and operable to turn off selected scanning cells in each column of scanning cells as each such column is energized whereby glow is transferred from said selected scanning cells to the associated display cells, and a source of anti-crosstalk pulses coupled to said scan electrode means for application thereto at the same time that display signals are coupled thereto.

2. The system defined in claim 1 wherein said display signals are generally negative pulses and said anti-crosstalk signals are generally positive pulses.

3. The system defined in claim 1 wherein said display signals are generally negative pulses and said anti-crosstalk signals are generally positive pulses, said display signals being of relatively greater magnitude than said anti-crosstalk signals so that, when both are applied together to said scan electrode means, the display signal overrides the anti-crosstalk signal.

4. The system defined in claim 1 wherein said display signals are generally negative pulses and said anti-crosstalk signals are generally positive pulses, said source of display signals and said source of anti-crosstalk signals being coupled through capacitor means to said scan electrode means.

5. A display panel and operating system therefor comprising a gas-filled display panel including a matrix of D.C. scanning cells arrayed in rows and columns and having a scan/address anode in operative relation with each row of scanning cells and a scan cathode in operative relation with each column of scanning cells, means for turning on all of the scanning cells of each column of scanning cells sequentially and for selectively turning off one or more scanning cells in each column as the column is turned on; and a matrix of display cells adjacent to said matrix of scanning cells, with each scanning cell communicating with a display cell through a small aperture in an electrode plate, and having display electrode means for operation to sustain display glow in a display cell after glow has been transferred thereto from a scanning cell, a source of sustaining signals coupled to said display electrode means, a separate source of display signals coupled to each said scan/address anode, each source being operable to turn off the scanning cells in each column of scanning cells with which its anode is associated as each such column is energized whereby glow is transferred from turned off scanning cells to the associated display cells, and a source of anti-crosstalk pulses coupled to said scan/address anode means for application thereto at the same time that display signals are coupled thereto.

6. The system defined in claim 5 wherein said display signals are generally negative pulses and said anti-crosstalk signals are generally positive pulses.

7. The system defined in claim 5 wherein said display signals are generally negative pulses and said anti-crosstalk signals are generally positive pulses, said display signals being of relatively greater magnitude than said anti-crosstalk signals so that, when both are applied together to said scan/address anodes, the display signal overrides the anti-crosstalk signal.

8. The system defined in claim 5 wherein said display signals are generally negative pulses and said anti-crosstalk signals are generally positive pulses, said source of display signals and said source of anti-crosstalk signals being coupled through separate capacitors to each scan/address anode.

* * * * *